Patented Dec. 8, 1931

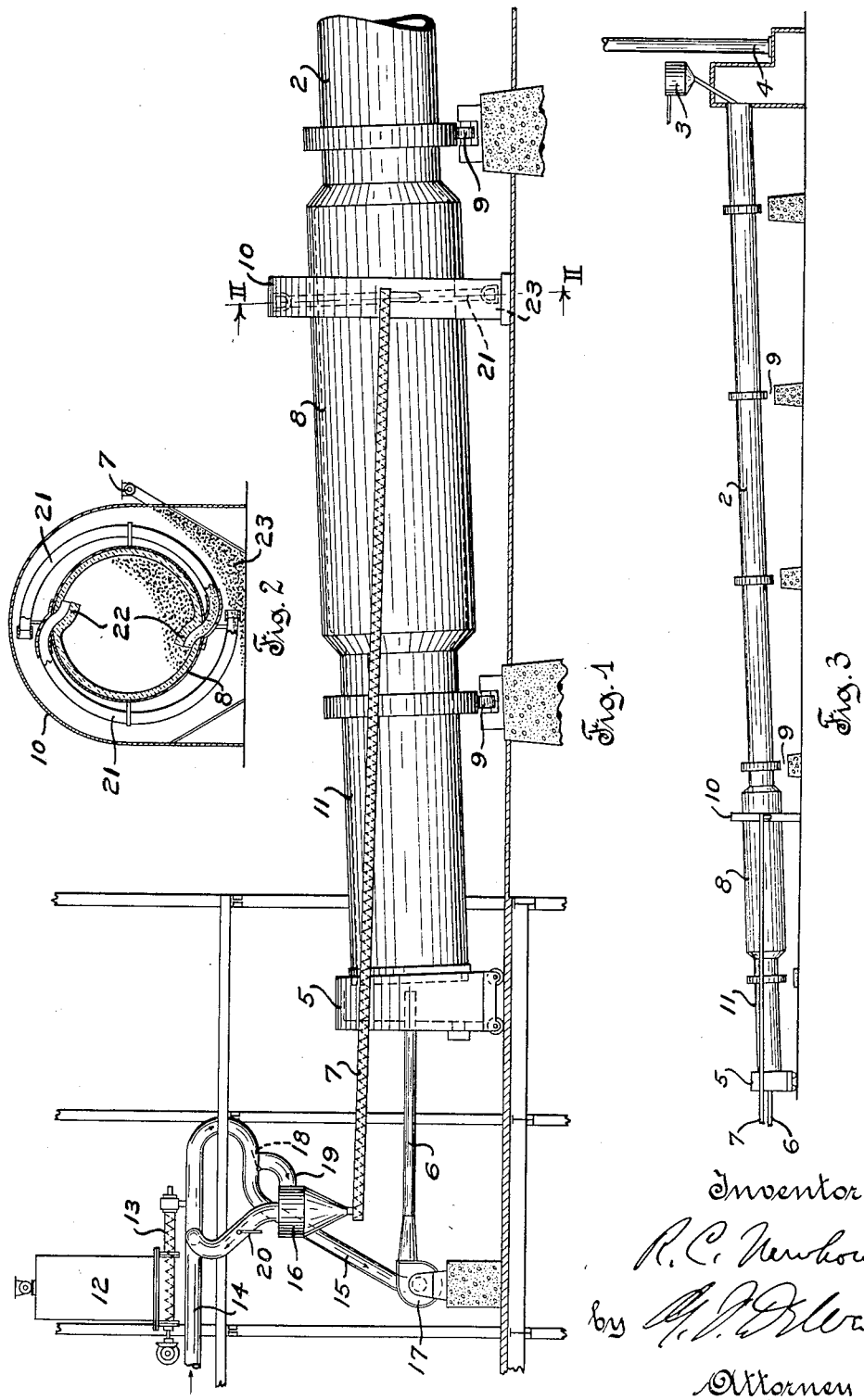

1,834,963

UNITED STATES PATENT OFFICE

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

PROCESS OF PRODUCING CEMENT

Application filed July 23, 1928. Serial No. 294,763.

The present invention relates generally to improvements in the art of manufacturing cement, and relates more specifically to an improved process of producing Portland cement or the like with the aid of a rotary kiln.

An object of the invention is to provide a simple and effective method of burning cement in a rotary kiln, whereby an exceedingly high grade product is produced.

It has been found in the operation of ordinary rotary kilns, that the use of an oxidizing flame in the clinkering zone of the kiln, produces better cement than when a reducing flame is employed. In order to maintain an oxidizing flame within the clinkering zone, it is necessary to introduce considerable excess air to the lower end of the kiln, and such excess air carries away a considerable amount of heat.

It is a more specific object of the present invention to provide an improved process enabling the use of an oxidizing flame in the clinkering zone of a rotary kiln, and for preventing loss of heat by escape of excess air employed to maintain the desired oxidizing flame.

In the operation of rotary kilns according to the prior art the material does not remain in the calcining zone of the kiln a sufficient length of time to completely dissociate the carbon dioxide. The result is that the material enters the fusion zone of the kiln with some carbon dioxide in combination. Since the dissociation of carbon dioxide from limestone and other calcareous material is an endothermic reaction, the interior of the fused clinker is chilled by the further dissociation of the carbon dioxide so that the temperature is reduced to a point which prevents the complete combination of the argillaceous and calcareous materials, resulting in free lime in the clinker, which, as is well known, is detrimental to the quality of the cement.

In accordance with the present improvement, an oxidizing flame resulting from primary burning of fuel is maintained in the clinkering zone with the aid of excess air, and this excess air is utilized to support secondary burning resulting from combustion of additional fuel which is admitted to the calcining zone, thus eliminating objectionable escape of heated excess air at the upper end of the kiln. The additional fuel may be mixed directly with the material as it passes through the calcining zone, and this fuel should be completely burned before reaching the clinkering zone. In this manner the present invention provides for effective maintenance of an oxidizing flame in the clinkering zone without entailing undesirable loss on account of uncombined heated air passing out the upper end of the kiln.

By the application of secondary fuel directly to the calcining zone of the kiln according to applicant's method, the combustion of the fuel takes place at a point in the kiln where the greatest quantity of heat is needed.

The mixing of the additional fuel with the material in the calcining zone has a further advantage on account of its being burned in intimate contact with the material. It is well known that hot carbon has an affinity for carbon dioxide gas, forming carbon monoxide gas, the reaction taking place acording to the following equation:

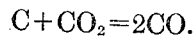
$$C + CO_2 = 2CO.$$

The presence of the carbon monoxide gas also reduces the gas tension of the carbon dioxide in the calcining zone, thereby causing the latter to be more freely released from the cement forming materials. The carbon monoxide gas escaping from the material tumbling in the rotary kiln, combines with the excess air from the clinkering zone and is burned in intimate contact with the material, thereby securing a better heat transfer than would be obtained if all of the fuel were burned in suspension above the material in the method commonly employed.

This condition results in the complete dissociation of the carbon dioxide at a temperature lower than that at which complete dissociation has taken place in the prior art devices. Such lower temperature of dissociation has a distinctly beneficial effect, since no fusion takes place at such lower temperature, resulting in a distinct separation between the calcining and the fusion zone, so that no carbonates can enter the fusion zone to cause the chilling effect referred to above with the resulting free lime of the clinker. By burning a portion of the fuel in intimate contact with the material where the greatest quantity of heat is needed, and at a lower temperature, the fuel efficiency is improved and a better quality of cement is produced, not only by the oxidizing flame in the fusion zone but also on account of the absence of free lime in the cement A clear conception of the several steps of the improved process for effecting commercial exploitation thereof, may be had by referring to the drawings accompanying and forming a part of this specification wherein like reference characters designate the same or similar parts in the various views.

Fig. 1 is a fragmentary side elevation of the lower end of a rotary kiln showing means for injecting additional fuel into the calcining zone thereof.

Fig. 2 is a transverse vertical section through the calcining zone of the kiln, showing the auxiliary fuel injecting mechanism and taken along line II—II of Fig. 1, looking in the direction of the arrows.

Fig. 3 is a diagrammatic side elevation of a complete rotary kiln.

The rotary kiln specifically illustrated in the drawings comprises a tubular casing or shell 2 supported upon roller bearings 9 with its axis slightly inclined as shown. The upper end of the shell 2 communicates with a stack 4 and is adapted to receive the cement forming material from a feeder 3. The lower end of the kiln communicates with a material discharge housing 5 through which fuel such as powdered coal may be injected by means of an inlet pipe 6, and through which air for supporting combustion of this fuel may also be admitted. The extreme lower portion of the shell 2 constitutes a clinkering zone 11 and the enlarged portion of the kiln directly above the clinkering zone 11 constitutes a calcining zone 8. The fuel admitted to the lower end of the kiln through the inlet pipe 6 may be injected through the pipe by means of a fan 17 communicating with a fuel supply 12 through piping 15 and a feeder 13. The piping 15 communicates with an air inlet pipe 14 located in advance of the feeder 13, and the air admitted through the pipe 14 and piping 15 constitutes a carrier for conveying the fuel into the inlet, and subsequently serves to support combustion of the fuel.

In accordance with the present invention the calcining zone 8 is provided intermediate its ends with means for injecting fuel and for mixing said fuel with the material passing through the calcining zone. The injecting means comprises a pair of spiral scoops 21 rotatable directly with the shell 2 and having their inner ends in communication with injection nozzles 22. The outer ends of the scoops 21 are adapted to dip in pulverized fuel 23 which is fed into a housing or bin 10 by means of a screw conveyor 7. The screw conveyor 7 receives the fuel conveyed thereby from an air separator 16 which has a tangential supply pipe 19 and the piping 15 is provided with a control gate 18 for shunting more or less of the powdered fuel passing through the pipe 15 into the air separator 16. The coarse material removed from the mixture supplied to the air separator 16 is discharged into the conveyor 7, and the fine material may be returned past a valve 20 to the air supply pipe 15 as clearly illustrated in Fig. 1.

During normal operation of the kiln the raw material or slurry is fed into the upper end of the shell 2 by means of the feeder 3 and progresses downwardly through the shell by the action of gravity thereon. Fuel is then admitted through the pipe 6 and is ignited within the clinkering zone 11. The gases of combustion generated by this ignition of the fuel travel upwardly through the kiln in direct contact with the material passing downwardly therethrough, and transform the slurry into the clinker which is discharged by gravity from the lower end of the kiln to the housing 5.

In order to maintain an oxidizing flame in the clinkering zone 11, excess air beyond that necessary for the combustion of the fuel delivered through the pipe 6, is admitted to the kiln at its lower end. This excess air passes upwardly through the calcining zone 8 in highly heated condition, and as it reaches the calcining zone it ignites the added fuel admitted through the scoops 21 and the injection nozzles 22, as well as the carbon monoxide gas formed by the combination of a part of the added fuel with the carbon dioxide dissociated from the cement forming materials. The gases of combustion resulting from this secondary burning as well as from the primary burning in the clinkering zone 11, pass upwardly through the remaining portion of the kiln and are eventually discharged together with the carbon dioxide driven from the cement forming materials, through the stack 4.

The enlargement forming the calcining zone 8 serves the purpose of retarding the travel of the material through this zone and of insuring effective mixing and calcining action. The mixture of the fuel with the material within the calcining zone insures burning thereof in intimate contact with the material and thereby produces a high grade cement. The equipment necessary for injecting auxiliary fuel into the calcining zone may assume other forms than that shown, although the apparatus illustrated herein is extremely simple and compact and will effectively accomplish the desired results.

It should be understood that it is not desired to limit the invention to the exact steps of the process and to the precise form of apparatus herein shown and described, for various modifications within the scope of the claims may occur to persons skilled in the art.

It is claimed and desired to secure by Letters Patent:

1. The process of producing cement in a rotary kiln, which comprises, introducing raw material and fuel to remote portions of the kiln, admitting air to the kiln in excess of that required to support combustion of said fuel in the clinkering zone, and supporting combustion of additional fuel admitted directly to the calcining zone with said excess air.

2. The process of producing cement in a rotary kiln, which comprises, introducing raw material and fuel to opposite ends of the kiln, burning said fuel in the presence of excess air in the clinkering zone, directly mixing other fuel with the material in the calcining zone, and supporting combustion of said other fuel with said excess air.

3. The process of producing cement in a rotary kiln, which comprises, introducing raw material to the kiln, subjecting said material to an oxidizing flame in the presence of excess air in the clinkering zone, and supporting combustion of other fuel admitted directly to the calcining zone with said excess air.

4. The process of producing cement in a rotary kiln, which comprises, introducing raw material and fuel to remote portions of the kiln, burning said fuel in the presence of excess air in the clinkering zone, and burning other fuel admitted directly to the calcining zone with said excess air.

5. The process of producing cement in a rotary kiln, which comprises, introducing raw material and fuel to the opposite ends of the kiln, burning said fuel in the presence of excess air in the clinkering zone to produce an oxidizing flame, and supporting combustion of additional fuel mixed with the material directly in the calcining zone with said excess air.

6. The process of producing cement in a rotary kiln having a clinkering and a calcining zone which comprises introducing fuel into the clinkering zone and raw materials into the kiln beyond the calcining zone, introducing other fuel directly into the calcining zone and mixing same with the raw material therein, admitting air in excess of that required to support combustion of the fuel admitted into the clinkering zone, passing the excess air over the fuel-material mixture within the calcining zone to support combustion of said fuel at a place where the greatest heat is needed, and removing the spent products of combustion from said kiln.

In testimony whereof, the signature of the inventor is affixed hereto.

RAY C. NEWHOUSE.